Aug. 7, 1934.　　　R. D. FAY ET AL　　　1,968,821
SUBMARINE SIGNALING
Original Filed May 21, 1925
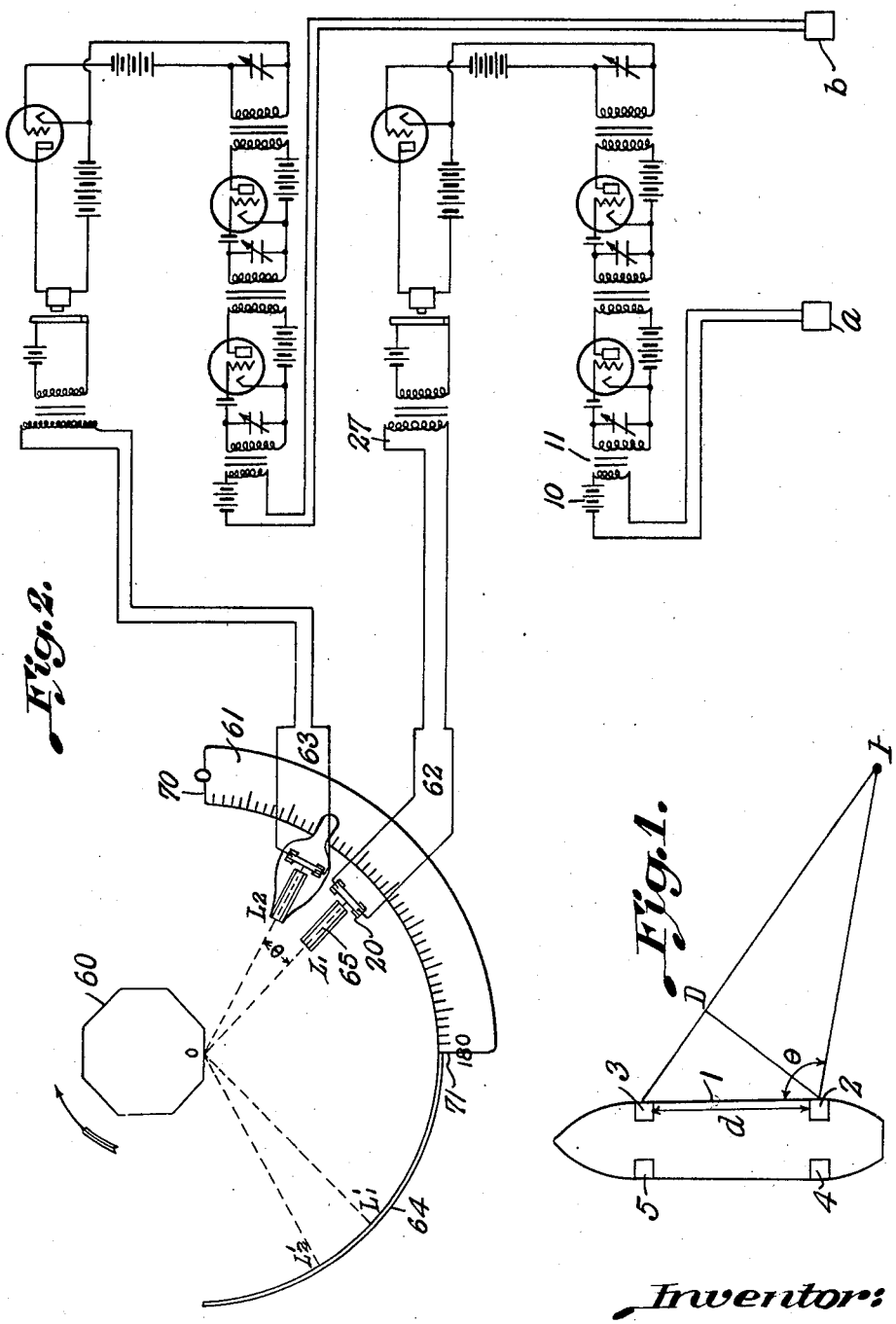
Inventors:
Herbert Grove Dorsey
Richard Dudley Fay Patented Aug. 7, 1934

1,968,821

UNITED STATES PATENT OFFICE 1,968,821

SUBMARINE SIGNALING

Richard D. Fay, Cambridge, Mass., and Herbert Grove Dorsey, Washington, D. C., assignors to Submarine Signal Company, Boston, Mass., a corporation of Maine Original application May 21, 1925, Serial No. 31,873, now Patent No. 1,784,137. Divided and this application August 31, 1929, Serial No. 389,746

5 Claims. (Cl. 177—386)

The present application is a division of our application Serial No. 31,873 filed May 21, 1925.

The present invention relates to a method of determining the direction of a source of sound by comparing the indications of receivers spaced at known distances apart.

The invention is more particularly directed to a method and apparatus which will indicate visually to an observer the direction of a source. As opposed to the method described in this specification is the binaural method of determining the direction of sound. Since the binaural method demands the training of an observer to adjust for a central image of the sound and since, further, the listener must wear a pair of telephones on his ears and must, more or less, stay right near the apparatus, a visual method has indeed many advantages over the well known binaural method.

While the present apparatus has been employed mostly for the purpose of determining the direction of a source of sound, it will be readily seen that it has utility in other fields, especially for comparing phase differences of sound or electric impulses and also for the measurement of short time intervals, depth and distance measurement.

Further objects, uses, and purposes of the invention will be understood from the following description and drawing in which:

Figure 1 shows the position of receivers on board of a vessel;

Figure 2, an apparatus, partly schematic, for carrying out the invention;

In Figure 1 is shown a vessel 1, in whch are placed two receivers 2 and 3, spaced at a definite distance apart. There may be other receivers on the same ship at 4 and 5, for instance so that not only starboard but also port direction may be observed. The receiver base can then conveniently be chosen as 5—3; 4—2; 5—4; or 3—2.

Figure 2 shows schematically in part, apparatus for performing the functions of the invention. The receivers are represented as $a$ and $b$, and may be any combination mentioned above. Each receiver passes the signal received through a detecting and amplifying circuit before reaching the indicator. Since the circuits for each receiver are similar, only one will be described. The circuit connected to the receiver $a$, which is shown as a microphone, is composed of a battery 10, a primary of a transformer 11, and suitable leads connecting the elements in series. The secondary of the transformer acts as an input to the amplifying and operating circuit, which is similar to the circuit shown in the patent of Herbert Grove Dorsey, No. 1,667,540 which issued April 24, 1928.

In Figure 2 the flashes are apparently brought together and the amount of adjustment in bringing the flashes together gives an indication of the angular direction. This will be explained more in detail later.

In Figure 2 there is provided a mirror which may be rotated at a uniform constant speed and maintained at such a speed in any desirable manner. Concentric with the center of rotation of the mirror 60 are positioned two discharge tubes 20 and 30, the tube 20 being permanently fixed while the tube 30 is adjustable in an arc. The arc 61 need be no more than one-quarter of the circumference.

The principle involved is best described by the operation. If the receivers connected with the circuits 62 and 63, respectively, should receive the signal from the source whose direction is to be determined simultaneously, and the indicators 20 and 30 should indicate accordingly simultaneously, then to have the indications occur at the same position of the screen 64, which is either of ground glass or some other suitable material, the angle between the indicators 20 and 30 should be zero. In Figure 4 these indicators are mounted one above the other, so that they may be made to reflect at the same point on the screen.

If the indications should occur at different times when the indicators are placed together, then the images would be thrown apart a given definite angle, depending upon the angular velocity of the mirror.

In Figure 2, if the indications are simultaneous and $\theta$ is the angle between the lines L1 and L2 of the beam of the indicators through the focusing tubes 65 and 66, the angle of the reflected beam will also be equal to $\theta$. If, however, the indications were to occur at different times, then the angle of the reflected beams OL1 and OL2 would be changed, dependent upon the speed of the rotated mirror.

If the mirror should rotate through an angle $w$ between the times of the occurrences of the two indications, then it can be shown mathematically that it will be necessary to separate the indicators so that the angle $\theta$ in Figure 2 is equal to $2w$. Thus if the sound was coming directly from the bow and consequently the time interval were the time necessary for the sound to travel the distance $d$ in Figure 1, for an angular difference of $\theta=45°$ the mirror would have to rotate 1/16 of a revolution to have the images coincide.

If $d$ were 200 feet, equivalent to 1/16 of a second, the speed of the mirror would have to be 24/16 revolutions per second, or 90 revolutions per minute. In this way the scale 61 could be marked just double the actual angle starting at the point 70 with zero degrees, meaning that the sound is coming directly from the bow and ending with the point 71 with 180 degrees, meaning that the sound is coming directly from the stern. For this calibration, the fixed indicator will have to be fixed in the bisector of the scale which is marked 90°. The ambiguity as to whether the direction of the source is from the forward quarter or the after quarter can easily be removed by having the indicators colored differently. It also may be noted that for a given direction of rotation of the mirror, the relative shifting of the images will assume definite directions with one another when the indicators are shifted. If, in Figure 2, the mirror was rotating clockwise and 30 was connected to the forward sound receiver, while 20 was connected to the stern receiver, then by moving 30 clockwise from its present relative position with respect to 20, towards 20 for a signal coming from the bow, the image of 30 would shift towards the left of the image of 20. If the sound was coming from the stern, the same movement of 30 would shift the image of 30 towards the right of the image of 20.

The calibration of the arc 61 may, therefore, be made directly in terms of angular bearing on one half of the ship as when the combination of receivers 2 and 3 of Figure 1 is used. Similarly, the direction of the port side may be determined by proper use of the receivers 4 and 5.

Having now described our invention, we claim:

1. In a system for measurement of the direction of a source of sound, a pair of sound receivers spaced at a known and definite distance, a pair of discharge indicators each of which may produce visual illuminations, means to connect each receiver to a corresponding illuminating means whereby a momentary illumination is produced by an illuminating means when the corresponding receiver receives sound energy, reflecting means having a constant angular velocity for reflecting the momentary operation of the indicator and means for adjusting the position of the indicators to bring the reflected images into the same position and a screen positioned across the various paths of the reflected illumination and a scale to indicate the amount of adjustment.

2. Means for determining the direction of a course of sound including a plurality of spaced receivers and means for indicating the direction of the source comprising a prismatic mirror adapted to be rotated at a constant rotational velocity, a plurality of indicating means adapted to produce a momentary illumination upon energization by said receivers, means operatively connecting said indicating means with said receivers, means for adjusting one of said indicating means cencentrically about the axis of said mirror, a screen for indicating when the images of the indications of the indicating means coincide and a scale associated with said adjusting means.

3. In means for determining the direction of a source of sound an indicating device comprising a prismatic mirror adapted to be rotated at a constant rotational velocity, a plurality of indicating means adapted to produce a momentary illumination upon energization, means for adjusting one of said indicating means concentrically about the axis of said mirror, a screen for indicating when the images of the indication of the indicating means coincide and a scale to measure the amount of the adjustment.

4. A system for determining the direction of a source of sound including a plurality of receivers of sound energy placed at a definite and known distance apart, a plurality of electro-responsive indicating means adapted to produce a momentary flash of light when energized, means to connect each receiver to a corresponding indicating means whereby a momentary illumination is produced by an indicating means when the corresponding receiver receives sound energy, a rotating mirror, said indicating means positioned to have the illumination of the same reflected by said mirror, means for adjusting angularly coaxially with the axis of the mirror at least one of said indicating means and a screen positioned across the various paths of the reflected illumination and a scale to indicate the amount of adjustment.

5. In a system for measurement of the direction of a source of sound, means for measuring the time interval between the receipt of signal impulses at two receivers spaced a known and definite interval apart including a prismatic mirror rotating at a constant velocity, a plurality of electro-responsive indicating means adapted to produce a momentary flash of light when energized, means to connect each receiver to a corresponding indicating means whereby a momentary illumination is produced by an indicating means when the corresponding receiver receives sound energy, said indicating means being adjustable angularly about the axis of the mirror and a screen positioned across the various paths of the reflected illumination whereby one may observe when the images produced by the indicating means have the same position, and a scale to indicate the amount of adjustment.

RICHARD D. FAY.
HERBERT GROVE DORSEY.